(12) United States Patent
Thirumurthi et al.

(10) Patent No.: US 10,554,547 B2
(45) Date of Patent: Feb. 4, 2020

(54) SCALABLE NETWORK ADDRESS TRANSLATION AT HIGH SPEED IN A NETWORK ENVIRONMENT

(71) Applicant: CISCO TECHNOLOGY, INC., San Jose, CA (US)

(72) Inventors: Rajendra Kumar Thirumurthi, Milpitas, CA (US); Samar Sharma, San Jose, CA (US); Puneet Kumar, San Francisco, CA (US); Mouli Vytla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 14/876,556

(22) Filed: Oct. 6, 2015

(65) Prior Publication Data

US 2016/0330117 A1 Nov. 10, 2016

Related U.S. Application Data

(60) Provisional application No. 62/158,416, filed on May 7, 2015.

(51) Int. Cl.
*H04L 12/741* (2013.01)
*H04L 12/721* (2013.01)
(Continued)

(52) U.S. Cl.
CPC .............. *H04L 45/74* (2013.01); *H04L 45/66* (2013.01); *H04L 61/2007* (2013.01); *H04L 63/101* (2013.01); *H04L 69/22* (2013.01)

(58) Field of Classification Search
CPC ....... H04L 45/74; H04L 45/66; H04L 61/103; H04L 61/2007; H04L 61/2514;
(Continued)

(56) References Cited

U.S. PATENT DOCUMENTS 6,317,775 B1 11/2001 Coile et al.
8,990,492 B1 * 3/2015 Zhou .................. H04L 45/54
711/105

(Continued)

OTHER PUBLICATIONS

PCT Jul. 8, 2016 International Search Report and Written Opinion from PCT/US2016/030576.
(Continued)

*Primary Examiner* — Jeffrey M Rutkowski
*Assistant Examiner* — Chae S Lee

(57) ABSTRACT

Embodiments include receiving configuration information including a match criterion for packets received at a network device in a network and a pool of layer 3 addresses associated with a set of servers in the network, resolving layer 2 destination addresses based on the layer 3 addresses of the servers, and programming a hardware layer of the network device based, at least in part, on the match criterion, the pool of layer 3 addresses, and the layer 2 destination addresses. Specific embodiments include configuring a policy to indicate that packets from an external source are to be forwarded to a server of the set of servers. Further embodiments include receiving a packet at the network device, and matching the packet to the pool of layer 3 addresses and the resolved layer 2 addresses based, at least in part, on the match criterion programmed in the hardware layer.

20 Claims, 4 Drawing Sheets

(51) Int. Cl.
*H04L 29/12* (2006.01)
*H04L 29/06* (2006.01)

(58) Field of Classification Search
CPC ............. H04L 61/2521; H04L 61/6009; H04L 63/101; H04L 69/22; H04L 67/1002; H04L 12/741; H04L 12/721; H04L 29/06; H04L 29/12; H04L 29/08
See application file for complete search history.

(56) References Cited

U.S. PATENT DOCUMENTS

| | | | |
|---|---|---|---|
| 2008/0263205 A1 | 10/2008 | Naseh | |
| 2009/0303880 A1* | 12/2009 | Maltz | H04L 45/02 |
| | | | 370/235 |
| 2011/0264806 A1 | 10/2011 | Teo et al. | |
| 2013/0151661 A1* | 6/2013 | Koponen | H04L 47/12 |
| | | | 709/217 |
| 2014/0321462 A1 | 10/2014 | Kancherla et al. | |
| 2015/0106804 A1* | 4/2015 | Chandrashekhar | H04L 45/741 |
| | | | 718/1 |
| 2015/0124622 A1 | 5/2015 | Kovvali et al. | |
| 2015/0180801 A1 | 6/2015 | Casado et al. | |
| 2017/0142011 A1* | 5/2017 | Zhang | H04L 45/745 |

OTHER PUBLICATIONS

"Chapter 2: Configuring ITD," *Cisco Nexus 7000 Series NX-OS Intelligent Traffic Director Configuration Guide, Release 6.x*, Cisco Systems, Inc., Oct. 17, 2014.

"Cisco ASA 5500 Series Configuration Guide using the CLI, Software Version 8.2," Cisco Systems, Inc., Chapters 26, 27, 28, 29, 30 and 31 only; Oct. 14, 2013.

"Cisco Intelligent Traffic Director," Cisco Systems, Inc., Jun. 2015; 4 pages.

Office Action in counterpart European Application No. 16722765.1, dated Sep. 20, 2018, 6 pages.

Examination Report titled "Summons to attend oral proceedings," in counterpart European Application No. 16722765.1, dated Jul. 3, 2019, 7 pages.

* cited by examiner

SCALABLE NETWORK ADDRESS TRANSLATION AT HIGH SPEED IN A NETWORK ENVIRONMENT

RELATED APPLICATION

This application claims the benefit under 35 U.S.C. § 119(e) of U.S. Provisional Application Ser. No. 62/158,416, filed May 7, 2015, by Rajendra Kumar Thirumurthi, et al., entitled "METHOD AND APPARATUS FOR MORE SCALABLE ADDRESS TRANSLATION AT HIGH SPEED IN A NETWORK ENVIRONMENT," which is hereby incorporated by reference in its entirety.

TECHNICAL FIELD

This disclosure relates in general to the field of networking, and more particularly, to scalable network address translation at high speed in a network environment.

BACKGROUND

In computer networking, destination network address translation (destination NAT) is a methodology in which network traffic destined to a virtual host can be redirected to a real host with actual services or information desired by the network traffic. The virtual host may be identified by an original destination network address, such as an Internet Protocol (IP) address, in forward path (client to server) packets of network traffic. The real host can be identified by a translated destination network address. For example, destination NAT can be accomplished by modifying network address information in IP datagram packet headers while they are in transit across a network device that performs the network address translation. Typically, switches provide network address or port address translation. NAT is often required for current network deployments to protect the internal IP network from external networks. This can result in packets being re-circulated multiple times when performing translation and address resolution before the packets are sent out of the switch or other network device.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Overview

Figure 1:
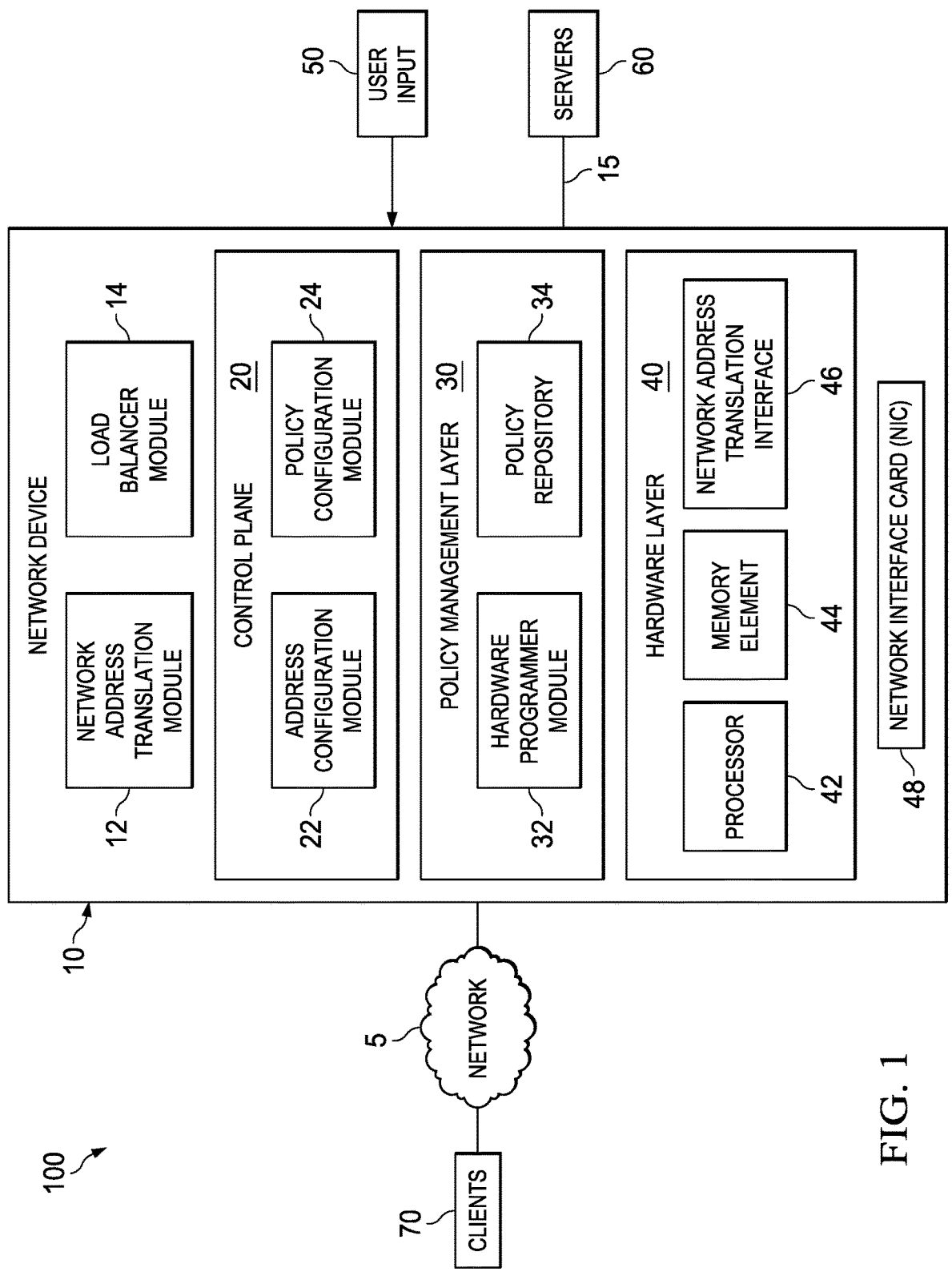
FIG. 1 is a simplified block diagram of a communication system for scalable network address translation at high speed according to at least one embodiment of the present disclosure.

The present disclosure describes methods of high speed network address translation. In one example, a method is provided in the present disclosure and includes receiving configuration information including a match criterion for packets received at a network device in a network and a pool of layer 3 addresses associated with a set of servers in the network. The method also includes resolving layer 2 destination addresses based on the layer 3 addresses of the servers and programming a hardware layer of the network device based, at least in part, on the match criterion, the pool of layer 3 addresses, and the layer 2 destination addresses.

In specific embodiments, the method further includes configuring a policy to indicate that any packet received by the network device from an external source is to be forwarded to a server of the set of servers if the match criterion is met. The hardware layer can be programmed to implement the policy. In specific embodiments, the method includes mapping an external layer 3 address of the network device in the match criterion to the pool of layer 3 addresses and mapping each layer 3 address in the pool to a layer 2 destination address resolved for that layer 3 address. In other specific embodiments, the programming the hardware layer includes configuring access control list (ACL) rules to match a packet if the packet includes a particular layer 3 destination address indicated in the configuration information.

In specific embodiments, the method includes receiving a packet at the network device where the packet includes a layer 3 destination address corresponding to an external layer 3 address of the network device. The method can also include matching the packet to the pool of layer 3 addresses and the resolved layer 2 addresses based, at least in part, on the match criterion programmed in the hardware layer. The matching can be performed in a single clock cycle. The method can further include selecting a server of the set of servers associated with the pool of layer 3 addresses to receive the packet. The server can be selected from the set of servers by load balancing the packet among the set of servers. The method can further include rewriting the packet to change the layer 3 destination address in the packet to an Internet Protocol (IP) address of the selected server, to change a layer 2 destination address in the packet to a Media Access Control (MAC) resolved for the IP address of the selected server, and to change a layer 2 source address in the packet to a Media Access Control (MAC) address of the network device.

In more specific embodiments, the hardware layer may include ternary content-addressable memory (TCAM) of an application-specific integrated circuit (ASIC). The match criterion may include at least one of a virtual Internet Protocol (VIP) address with a port number or a VIP address without a port number. The pool of layer 3 addresses may include layer 3 (L3) Internet Protocol (IP) addresses of the set of servers. The layer 2 destination addresses may include Media Access Control (MAC) addresses resolved for the layer 3 Internet Protocol addresses.

Some or all of the elements, operations, and features may be included in respective systems, apparatuses, and devices for performing the described functionality. Furthermore, some or all of the features may be implemented in at least one machine readable storage medium.

Description

FIG. 1 is a simplified block diagram of a communication system 100 for scalable network address translation at high speed in a network environment. FIG. 1 includes a network device 10, which is coupled to servers 60 in a network 15. Network device 10 can be configured by user input 50. User input 50 can include configuration information for configuring network address translation on network device 10 and can be provided via a suitable user interface of network device 10 or through a separate device or medium capable of providing the configuration information to the network device. Network 5 can provide suitable connectivity between network device 10 and external clients 70, to facilitate communication exchanges between clients 70 and servers 60. In at least one embodiment, network device 10 can be configured with a control plane 20, a policy management layer 30, and a hardware layer 40. Control plane 20 can include an address configuration module 22 and a policy configuration module 24. Policy management layer 30 can include a hardware programmer module 32 and a policy repository 34. Hardware layer 40 can include a processor 42, a memory element 44, and a network address translation (NAT) interface 46. Additionally, network device 10 can also include a network address translation (NAT) module 12, load balancer module 14, and a network interface card (NIC) 48.

For purposes of illustrating certain example techniques of communication system 100, it is important to understand the communications that may be traversing the network and the protocols used in effecting such communications. The following foundational information may be viewed as a basis from which the present disclosure may be properly explained.

Network address translation (NAT) is often used by an enterprise network (e.g., service provider or other entity) or other networks that have at least some private network addresses. For example, NAT can be used to hide actual Internet Protocol addresses of hosts within a network from clients outside of the network. Network address or port address translation is typically provided by a network device such as a switch, router or firewall, for example. One or more public virtual IP addresses may be used by the NAT device to represent the hosts in the network to the clients outside the network. A virtual IP address can map one public (external) IP address to multiple IP addresses in the network. When a packet traverses the NAT device, the NAT device translates the private IP address of the host to the public IP address and vice versa, depending on whether the packet is incoming or outgoing.

Network service appliances (e.g., firewalls, load balancers, intrusion protection systems (IPSes), intrusion detection systems (IDSes), denial of service (DoS) protections, etc.) are examples of hosts that are widely deployed in enterprise, datacenter and cloud network environments. Service appliances are often deployed adjacent to a network device (e.g., switch, router, switch/router combination) that feeds traffic to the service appliances. Highly scalable network address translation is a bottleneck in some service appliances, because current service appliances maintain states and flows, and packets are re-circulated within the system to perform address translation. This can result in latency in packet forwarding, as well as load on the service appliances. Typically, re-circulation of packets occurs one or more times in a system during address translation operations.

Embodiments of a communication system as described herein can resolve the aforementioned issues (and more) associated with network address translation at high speeds. Embodiments disclosed herein provide a mechanism to perform single packet processing for translation and address resolution before sending the packet out of a network device, such as a switch. A hardware processor (e.g., application specific integrated circuit (ASIC)) of a network device can be configured so that layer 2 (L2) destination addresses and layer 3 (L3) destination addresses in the network are known. Also, the hardware processor can be configured to know the layer 2 (L2) source address to write in a packet during address translation. In at least one implementation, L3 destination addresses that are programmed in the hardware layer of the network device can be pre-defined Internet Protocol (IP) addresses of certain servers in the network, L2 destination addresses that are programmed in the hardware layer of the network device can be media access control (MAC) addresses resolved based on the pre-defined IP addresses of servers in the network, and an L2 source address that is programmed in the hardware layer of the network device can be a media access control (MAC) address of the network device.

The hardware processor can also be configured based on one or more match criteria, such as an external L3 address of the network device, to be used to match incoming traffic to the L2 and L3 destination addresses configured in the hardware. In one example, the external L3 address can be a virtual IP address. The network device with NAT may make load balancing decisions when a packet is received from a client outside of the network and matched to a set of L3 and L2 addresses already configured in the hardware. In at least one embodiment, address translation and redirection of the packet can be performed in a single processing speed (i.e., a single clock cycle of the network device), instead of re-circulating the packet multiple times. This can be achieved because, according to embodiments described herein, the information to perform the translation is known by the hardware processor before the traffic is received. A clock cycle is a single electronic pulse of a processor.

Several advantages are provided by embodiments disclosed herein. First, embodiments disclosed herein offer increased scalability and optimization for network address translation. Embodiments disclosed herein are scalable and perform translation in a single processing speed. At least one embodiment is highly usable in load balancing functionality, where the mapping between the servers and the address to be translated can be predetermined. In at least one embodiment, a hardware layer (e.g., application-specific integrated circuit (ASIC) with ternary content addressable memory (TCAM)) can be programmed during configuration processing to know the L3 destination addresses and L2 destination addresses associated with selected servers in a network. Furthermore, even a server move (e.g., IP address change) or L2 address change (e.g., MAC address change) can be detected and configured quickly if a disclosed embodiment is implemented. For example, a monitoring mechanism can be provisioned in communication system 100 to provide an indication of a change to a server. If a server is down or otherwise not reachable, received network traffic can be load balanced based on the available servers of the matched pool of L3 addresses. If a server has moved, however, the network device can be quickly reconfigured by a network administrator with an updated pool of L3 addresses.

Turning to FIG. 1, a description of the infrastructure of communication system 100 is now provided. Generally, communication system 100 can be implemented in any type or topology of networks. Within the context of the disclosure, networks such as network 5 and network 15 represent a series of points, nodes, or network elements of interconnected communication paths for receiving and transmitting packets of information that propagate through communication system 100. These networks offer communicative interfaces between sources, destinations, and intermediate nodes, and may include any local area network (LAN), virtual local area network (VLAN), wide area network (WAN) such as the Internet, wireless local area network (WLAN), metropolitan area network (MAN), Intranet, Extranet, virtual private network (VPN), and/or any other appropriate architecture or system that facilitates communications in a network environment or any suitable combination thereof, including wired and/or wireless communication. Additionally, radio signal communications over a cellular network may also be provided in communication system 100. Suitable interfaces and infrastructure may be provided to enable communication with the cellular network. In one possible embodiment, network 15 represents an enterprise network that includes at least some private network addresses, and network 5 represents the Internet or other WAN that enables clients 70 to access services offered in network 15.

Communications in communication system 100 are referred to herein as 'network traffic' or 'traffic', which may be inclusive of packets. Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). Suitable communication messaging protocols may have multiple communication layers, including at least a data link layer and a network layer, which are referred to herein as layer 2 (L2) and layer 3 (L3), respectively. Generally, L2 sets up links across the physical network and transfers data between adjacent nodes using unique physical (i.e., hardware) addresses. In at least one embodiment, these physical addresses (i.e., L2 addresses) can be media access control (MAC) addresses. Generally, L3 is responsible for packet forwarding and routing through intermediate switches/routers from a source to a destination. Network addresses (i.e., L3 addresses) are used to facilitate routing network traffic. In at least one embodiment, the Internet Protocol (IP) is associated with L3 and IP addresses are the L3 addresses used to facilitate routing network traffic.

A packet is a formatted unit of data, and can contain both control information (e.g., source network addresses, destination network addresses, source physical addresses, destination physical addresses, source ports, destination ports, etc.) and data, which is also known as payload. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, replies, queries, etc. are forms of network traffic, and therefore, may comprise packets.

Clients 70 can be associated with customers, end users, devices or nodes provisioned externally to network 15 that can initiate a communication in communication system 100 via some network. The term 'client' is inclusive of devices used to initiate a communication, such as a desktop computer, laptop computer, tablet, mobile device, smart phone, smart appliance, gaming device, server, or any other device, component, element, or object capable of initiating voice, audio, video, media, or data exchanges within communication system 100. Clients 70 may also be inclusive of a suitable interface to a human user, such as a display, a keyboard, a touchpad, a remote control, or other terminal equipment. Clients 70 may also be any device that seeks to initiate a communication on behalf of another entity or element, such as a program, a database, or any other component, device, element, or object capable of initiating an exchange within communication system 100.

Servers 60 can be associated with nodes provisioned behind a network device (e.g., network device 10) in a network (e.g., network 15) that are capable of communicating with clients in other networks via the network device. The term 'server' is inclusive of computing device(s) capable of hosting and/or serving software applications and other programs, including local, distributed, enterprise, or cloud-based software applications. Servers 60 can include, but are not limited to, service appliances, database servers, file servers, mail servers, print servers, web servers, gaming servers, application servers, etc. In some instances, some combination of servers can be hosted on a common computing system, server, or server pool, and share computing resources, including shared memory, processors, and interfaces, such as in an enterprise system providing services to a plurality of distinct clients and customers.

Network device 10 is a network element that facilitates communications between clients and servers in different networks. As used herein, the term 'network element' is meant to encompass any of the aforementioned elements, as well as routers, switches, gateways, bridges, load balancers, service appliances, firewalls, servers, processors, modules (any of which may be physical or virtually implemented on physical hardware) or any other suitable device, component, element, proprietary appliance, or object that is operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

In at least one example implementation, network device 10 represents a node with improved NAT capabilities, and includes logic to achieve (or to foster) the activities as outlined herein. Note that in at least one example, each of these elements (e.g., network device, clients 70, servers 60) can have an internal structure (e.g., processors, memory elements, network interface cards, etc.) to facilitate some of the operations described herein. In some embodiments, these activities may be executed externally to these elements, or included in some other network element to achieve this intended functionality. In at least one embodiment, these nodes may include logic (or reciprocating logic) that can coordinate with other network elements, clients and/or servers in order to achieve the operations, as outlined herein. Furthermore, one or several devices may include any suitable algorithms, hardware, firmware, software, components, modules, interfaces, or objects that facilitate the operations thereof. In at least one embodiment, a network device such as network device 10 may include a software feature (e.g., hardware programmer module 32) used with ternary content-addressable memory (TCAM) to configure or program NAT translation interface 46 of the network device.

In at least one embodiment of network device 10, control plane 20, policy management layer 30, and hardware layer 40 cooperate to help perform network address translation and redirection of packets in single clock cycle. Network device 10 may be configured according to user input 50. User input 50 includes configuration information used to construct policies to be used for programming the hardware layer to perform high speed translations.

User input 50 may be provided to network device 10 using any suitable communication and appropriate authorization based on particular implementations and/or needs of communication system 100. In one example, user input 50 may be provided from a separate computing device capable of communicating with network device 10 via some network (e.g., network 15, network 5, and/or other networks). In another example, user input 50 may be provided via a preconfigured object (e.g., file including data and/or executable software, etc.) communicated via some network or via some physical mechanism (e.g., physical storage medium such as a universal serial bus). In yet another example, user input 50 may be provided via a user interface coupled to network device 10. The enumerated ways in which user input can be provided to network device 10 are intended to be illustrative examples and are not intended to limit the broad scope of the application and potential possibilities of embodiments.

Control plane 20 may be configured to receive configuration information of user input 50. The configuration information can include a match criterion for network traffic, along with a pool of L3 addresses corresponding to a set of servers in network 15 to which matched network traffic can be forwarded. In at least one embodiment, a match criterion can include an external L3 address assigned to network device 10 for receiving network traffic from an external source. Address configuration module 22 can resolve routes with the L3 addresses (e.g., Internet Protocol (IP) addresses) in the address pool to be used in translations. This includes resolving the L2 addresses (e.g., MAC addresses) for each L3 address in the address pool. Additionally, in some implementations, multiple match criteria (e.g., multiple external L3 addresses of network device 10) and one or more pools of L3 addresses may be provided in the configuration information.

Policy configuration module 24 can construct a policy to indicate the match criterion for network traffic received by network device 10 and the L2 and L3 information of the set of servers to which matched network traffic is to be redirected. These policies may be constructed based on the configuration information from user input 50 and the resolved L2 and L3 information for translations. For example, a policy may specify that network traffic that meets a match criterion (e.g., contains a particular virtual Internet Protocol (VIP) address) is to be forwarded to any server of a set of servers, which are specified in the policy by the resolved L2 and L3 information. Policies may be stored in policy repository 34.

In at least one embodiment, policy management layer 30 is a middle layer between control plane 20 and hardware layer 40, and may be configured to read, interpret, and implement the policies obtained from policy repository 34. Hardware programmer module 32 can read and interpret the policies. Hardware programmer module 32 can also program hardware layer 40 to implement the policies when network traffic is received at network device 10.

In one example implementation, processor 42 of hardware layer 40 is an application-specific integrated circuit (ASIC) with memory element 44, which can include a ternary content-addressable memory (TCAM). TCAM is a high-speed memory that can search its entire contents in a single clock cycle. TCAM can enable access control list (ACL) tables or just network addresses to be cached in hardware, thus facilitating high speed lookups for network addresses, such as IP addresses. A software feature, such as hardware programmer module 32, may be used with TCAM to configure or program NAT interface 46 of hardware layer 40 to achieve the desired configuration of hardware layer 40.

In one example implementation, hardware programmer module 32 can configure access control list (ACL) rules in hardware layer 40 based on match criteria of policies in policy repository 34. In other examples, hardware programmer module 32 can configure one or more external L3 addresses (e.g., VIP addresses of the network device) in hardware layer 40 based on match criteria of policies in policy repository 34. Hardware programmer module 32 can also configure the hardware layer with resolved L2 and L3 information associated with each set of servers corresponding to a match criterion in the policies. Such configurations of hardware layer 40 enable high speed translations of L3 destination addresses in network traffic received by network device 10 from an external source. Additionally, one or more network interface cards (e.g., NIC 48) may be provided in network device 10 to enable communications via networks 5 and 15 to clients 70 and servers 60.

In at least one embodiment, network device may also include load balancer module 14. Load balancer module 14 can be used to distribute network traffic across multiple servers. In at least one embodiment, load balancing can be based on a pre-defined given pool of server L3 addresses, provided in configuration information, which was used to construct a policy and program the hardware layer of the network device.

Network device 10 may also include NAT module 12. NAT module 12 can be used to perform reverse NAT translation for server-to-client communications. For example, after client-to-server network traffic is identified at network device 10 for network address translation (e.g., through VIP match in hardware or ACL rules), communications from the server to the client may be reverse translated at network device 10 in order to be routed to the client.

Figure 2:
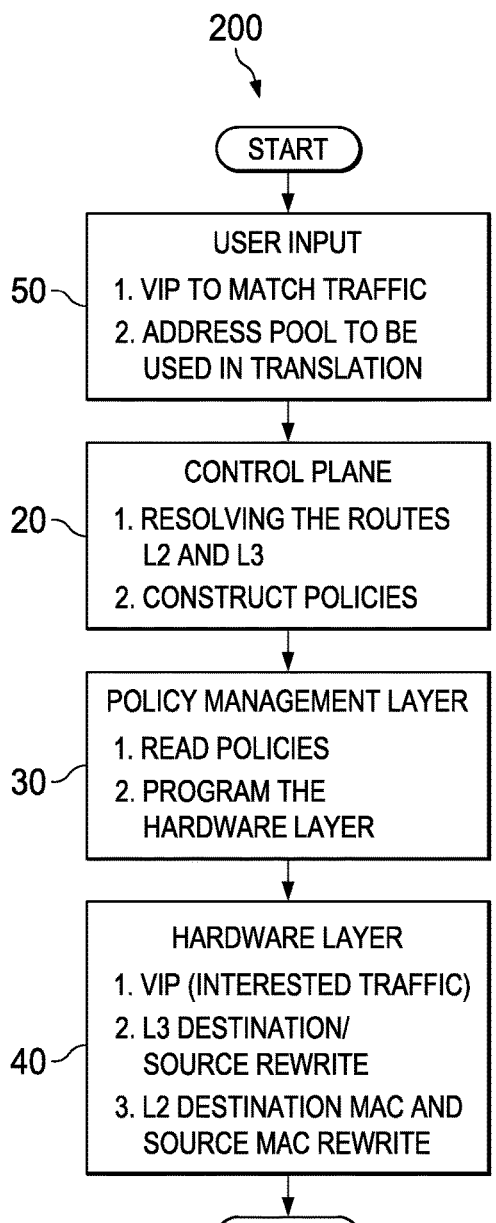
FIG. 2 is a simplified block diagram depicting an example process associated with at least one embodiment of the present disclosure.

With reference to FIG. 2, a simplified block diagram illustrates a process 200 associated with communication system 100 for performing network address translation and redirection of packets in a single processing speed according to at least one embodiment in the present disclosure. For ease of explanation, example process 200 is described with reference to layer 3 (L3) Internet Protocol (IP) addresses and layer 2 (L2) media access control (MAC) addresses used for communication exchanges within communication system 100. It will be apparent, however, that the broad teachings of the present disclosure are applicable to any number of other communication protocols and network addressing schemes.

Process 200 involves user input 50, control plane 20, policy management layer 30, and hardware layer 40. User input 50 can provide configuration information via a suitable user interface, computing device, or preconfigured data provided to control plane 20, for example. In at least one embodiment, the configuration information provides at least one match criterion for identifying network traffic to be translated when the match criterion is met. Match criteria can include access control list (ACL) rules and/or a list of one or more external network addresses (e.g., virtual Internet Protocol (VIP) addresses) to match and perform IP network address translation. In at least one embodiment, network traffic may be matched based on ACL rules programmed in hardware layer 40 during process 200. In at least one other embodiment, the network traffic may be matched to VIP addresses programmed in hardware layer 40 during process 200, where the matching is based just on the source and/or destination IP addresses.

The configuration information can also include one or more IP address pools to be used in address translation of network traffic that matches ACL rules or VIP addresses. An address pool can include multiple IP addresses corresponding to a set of servers (e.g., subset of servers 60). In one example, the set of servers may include a plurality of service appliances (e.g., firewalls, intrusion protection systems (IPSes), intrusion detection systems (IDSes), denial of service (DoS) protections, etc.). In the configuration information, an address pool is associated with one or more match criteria. For example, if the match criteria include two external VIP addresses, then an address pool could be mapped to both of the VIP addresses. In another example, two different address pools could be mapped, respectively, to the two VIP addresses. In some implementations, when configuration information includes multiple address pools, each address pool may contain unique L3 addresses not included in other address pools. In other implementations, at least one L3 address may be included in multiple address pools.

For the given address pools provided in the configuration information, control plane 20 processing can resolve routes of each Layer 3 (L3) IP address used in translation. Control plane 20 processing can resolve Layer 2 (L2) media access control (MAC) addresses for the IP addresses to be used to rewrite the packet. In addition, policies are constructed to be used to program hardware layer 40. In at least one example, these policies may be stored in policy repository 34 of policy management layer 30. Policy information can include:

1. Policy match criteria, which can be an ACL or just a source/destination IP address;
2. IP address/address pool that can be used to translate the VIP address;
3. L2 MAC addresses resolved for IP addresses in the IP address pool.

In policy management layer 30, policies may be read from policy repository 34 in at least some embodiments. Policies that are read may also be validated. For example, a policy may be validated by examining a policy identifier (policy ID) of the policy to ensure there are no duplicate policies.

Hardware layer 40 can be programmed (or configured) based on the policies. Hardware layer 40 can be configured to match traffic based on the ACL rules or user specified external VIP addresses. Hardware layer 40 can also be configured to rewrite an L3 source or destination IP address based on policy type. In addition, hardware layer 40 can be configured to rewrite L2 source and destination MAC addresses. In at least one possible implementation, hardware layer 40 comprises ternary content-addressable memory (TCAM) with an application specific integrated circuit (ASIC). TCAM is a high-speed memory that can search its entire contents in a single clock cycle. A software feature, such as hardware programmer module 32, may be used with TCAM to configure NAT translation interface 46 of hardware layer 40 to achieve the desired configuration of hardware layer 40.

Figure 3:
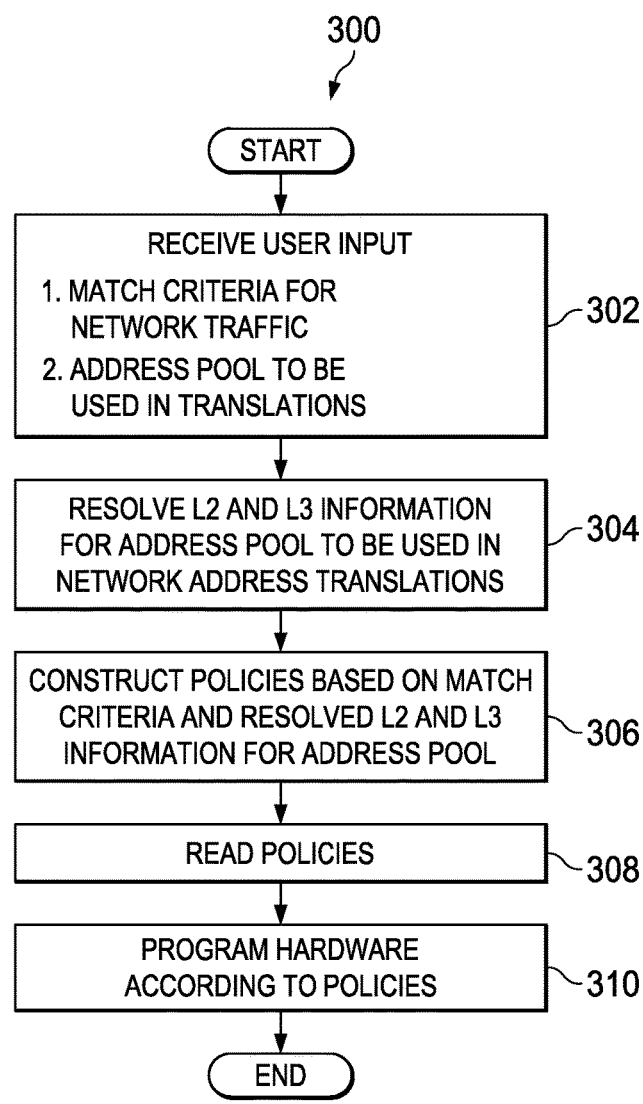
FIG. 3 is a simplified flowchart of potential operations associated with the communication system according to at least one embodiment of the present disclosure.

Turning to FIG. 3, FIG. 3 is a simplified flowchart 300 illustrating potential operations that may be associated with embodiments described herein. In at least one embodiment, one or more sets of operations correspond to activities of FIG. 3. In at least one embodiment, network device 10 may comprise means such as one or more processors (e.g., processor 42), for performing the operations. In one example, at least some operations shown in flowchart 300 may be performed by address configuration module 22, policy configuration module 24, and hardware programmer module 32 when executed by one or more processors such as processor 42.

At 302, network device 10 receives user input with configuration information that indicates how to configure network device 10 to perform network address translations on traffic received from an external source, such as any one of clients 70. The configuration information may include match criteria for the network traffic. An example of match criteria includes, but is not limited to, external L3 addresses assigned to network device 10, that correspond to L3 destination addresses in network traffic received by network device 10. In an implementation involving TCP/IP protocol, an external L3 address may include an IP address with or without parameters (e.g., L4 parameters) and with or without a port number. In at least some embodiments, the external L3 address is a virtual IP (VIP) address.

The configuration information can also include an address pool mapped to a particular match criterion in the configuration information. An address pool can include multiple L3 addresses of selected servers (e.g., subset of servers 60) in the network. These L3 addresses of the servers can be private, static L3 addresses of network 15, which may be assigned by a network administrator in at least one embodiment. Address pools mapped to the match criteria may be configured in any suitable groupings based on particular implementations and needs. For example, consider the match criteria including multiple VIP addresses to be matched to network traffic. In one example, a given address pool can be mapped to each of the VIP addresses in the configuration information. In another example, a given address pool can be mapped to some, but not all, VIP addresses in the configuration information, and one or more other address pools can be mapped to the other VIP addresses. In yet another example, each VIP address may be mapped to a unique address pool in the configuration information. Although multiple match criteria and address pools may be used to configure the network address translations in accordance with embodiments disclosed herein, for ease of explanation, the operations of flowchart 300 will be further described with reference to a single match criterion (e.g., a single external L3 address) mapped to a single address pool in the configuration information.

At 304, network device 10 resolves L2 and L3 information that is to be used in network address translations. Specifically, destination L2 addresses can be resolved for the L3 addresses of the selected servers associated with the address pool. The L3 addresses of the address pool can be obtained from the configuration information in at least one embodiment. In an implementation involving TCP/IP protocol, L2 MAC addresses can be resolved for the L3 IP addresses of the address pool. An L2 MAC address that is resolved for an L3 address of a particular server is the next-hop L2 MAC address in a path toward the particular server. Thus, the resolved L2 MAC address could be an L2 MAC address of the server itself if the server is the next-hop, or the resolved L2 MAC address could be an L2 MAC address of an intermediate node between network device 10 and the server.

At 306, a policy can be constructed based on the match criterion and the resolved L2 and L3 information for the address pool. In an implementation involving TCP/IP protocol, the policy can include IP addresses and MAC addresses. For example, if the match criterion is an external VIP address of network device 10, a policy can be constructed to indicate that a received packet having an L3 destination address that matches the VIP address, is to be translated to redirect the packet to one of a pool of destination IP addresses, and forwarded according to their associated destination MAC addresses. The policy may also include a source MAC address, which can be the MAC address of network device 10. Thus, the L2 and L3 information is resolved before network traffic is received by network device 10. Constructed policies can be stored in policy repository 34.

In one example implementation, each VIP address could be associated with a different service and, therefore, a different set of servers (e.g., service appliances) in the corresponding address pool. In addition, a VIP address could include an IP address or an IP address with L4 parameters. Furthermore, a VIP could be specified with or without a port number. In at least one embodiment, the L3 destination address in a packet of network traffic received by network device 10 is matched to a VIP address just as it has been configured (e.g., with or without parameters, with or without port numbers).

At 308, policies stored in policy repository 34 may be read and interpreted. The interpreted policies can be used at 310, to program hardware layer 40 of network device 10. In a particular implementation, memory element 44 may include TCAM, which can be programmed according to the policies. In at least one embodiment, the TCAM is programmed with ACL rules or just VIP addresses of network device 10 to match network traffic based on an L3 destination address of the network traffic, and then to identify other information (e.g., L2 and L3 information) needed to perform a network address translation for the L3 destination address in the network traffic.

Figure 4:
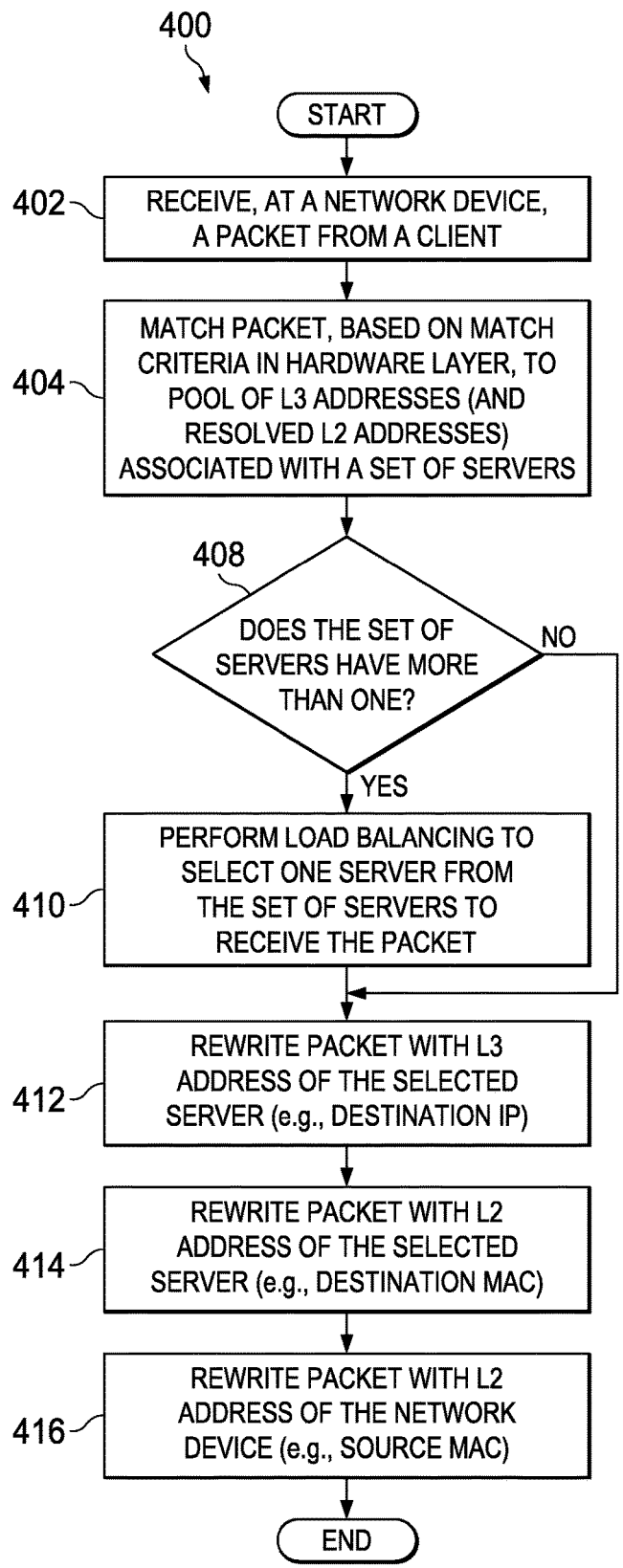
FIG. 4 is a simplified flowchart of potential operations associated with the communication system according to at least one embodiment of the present disclosure.

FIG. 4 is a simplified flowchart 400 illustrating potential operations that may be associated with embodiments described herein. In at least one embodiment, one or more sets of operations correspond to activities of FIG. 4. In at least one embodiment, network device 10 may comprise means such as one or more processors (e.g., processor 42), for performing the operations. In one example, at least some operations shown in flowchart 400 may be performed by network address translation interface 46 and load balancer module 14.

At 402, a packet, which has an L3 destination address corresponding to an external L3 address of network device 10, is received at network device 10 from a client external to network 15. Address translation of the packet can be performed in a single processing speed (i.e., a single clock cycle of the network device), instead of re-circulating the packet multiple times, because the information to perform the translation is programmed into hardware layer 40. At 404, the packet is matched to a pool of L3 addresses (and resolved L2 addresses) associated with a set of servers in the network, based on one or more match criteria programmed in the hardware layer. For example, the packet can be matched to the pool of L3 addresses by determining the L3 destination address of the packet corresponds to one of the user specified L3 addresses (or based on ACL rules) programmed in hardware layer 40. The corresponding L3 address is mapped, in the hardware layer, to the pool of L3 addresses (and resolved L2 addresses) associated with the set of servers to which the packet may be redirected. The corresponding L3 address may also be mapped to the L2 address of network device 10.

At 408, a determination is made as to whether the set of servers associated with the pool of L3 addresses contains more than one server for which load balancing can be performed. If the set of servers contains more than one server, then at 410, load balancing may be performed for the set of servers to select one of the servers to receive the packet. Load balancing can be based on the source IP address and the destination IP address of the packet in at least one embodiment.

At 412, the L3 destination address in the packet can be rewritten with the L3 address for the selected server. In a TCP/IP implementation, this can be the new destination IP address for the packet. At 414, the L2 destination address in the packet can be rewritten with the L2 address previously resolved during configuration for the L3 address of the selected server. In a TCP/IP implementation, this can be the new destination MAC address for the packet. At 416, the source L2 address in the packet can be rewritten with the L2 address of the network device. In a TCP/IP implementation, this can be the new source MAC address for the packet. The L3 source address in the packet can remain the same, which is the L3 address of the client. Because the L2 and L3 information to be used in translations is resolved prior to the packet being received, the packet can be translated in a single clock cycle of network device 10. Subsequent packets of the same flow can follow the same path and each packet can be translated like the first packet.

Figure 5:
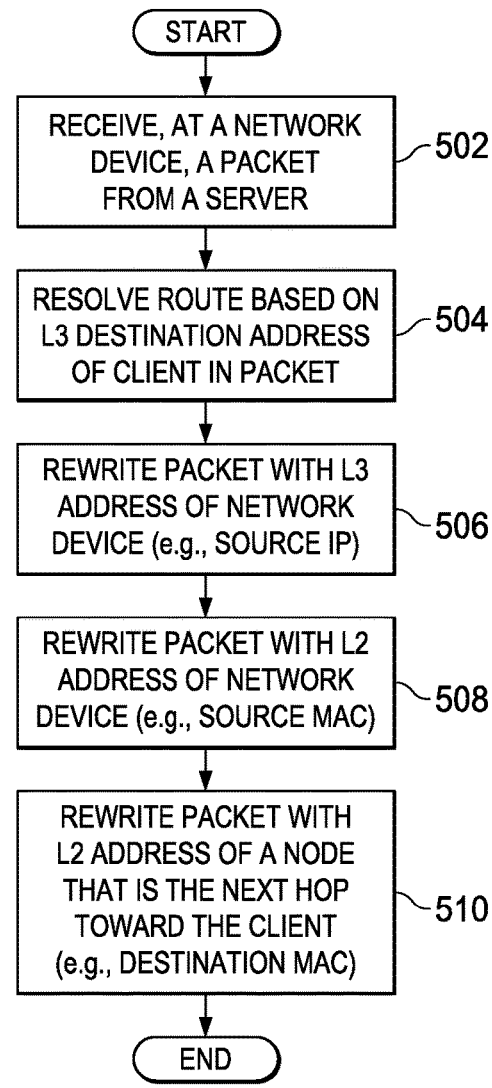
FIG. 5 is a simplified flowchart of possible operations associated with the communication system according to at least one embodiment of the present disclosure.

FIG. 5 is a simplified flowchart 500 illustrating potential operations that may be associated with embodiments described herein. In at least one embodiment, one or more sets of operations correspond to activities of FIG. 5. In at least one embodiment, network device 10 may comprise means such as one or more processors (e.g., processor 42), for performing the operations. In one example, at least some operations shown in flowchart 500 may be performed by NAT module 12.

Flowchart 500 depicts an example flow in which a server (e.g., servers 60) has previously received a communication from an external client (e.g., clients 70) and is sending a communication back to the client. At 502, network device 10 receives a packet from the server. The L3 source address and L2 source address in the received packet are, respectively, the L3 address of the server and the L2 address previously resolved for the L3 address of the server. The L3 destination address in the received packet is the L3 address of the external client. The L2 destination address in the received packet is the L2 address of network device 10.

At 504, network device 10 determines a route for the packet based on the L3destination address in the packet, which is the L3 address of the external client. At 506, the L3 source address in the packet can be rewritten with the L3 address of the network device. In a TCP/IP implementation, this can be the external VIP address of the network device. At 508, the L2 source address in the packet can be rewritten with the L2 address of the network device. In a TCP/IP implementation, this can be the MAC address of the network device. At 510, the L2 destination address can be rewritten with the L2 address of a node that is the next-hop in the resolved route toward the client. In a TCP/IP implementation, this can be the MAC address of the next-hop node. The L3 destination address in the packet can remain the same, which is the L3 address of the client.

Figure 6:
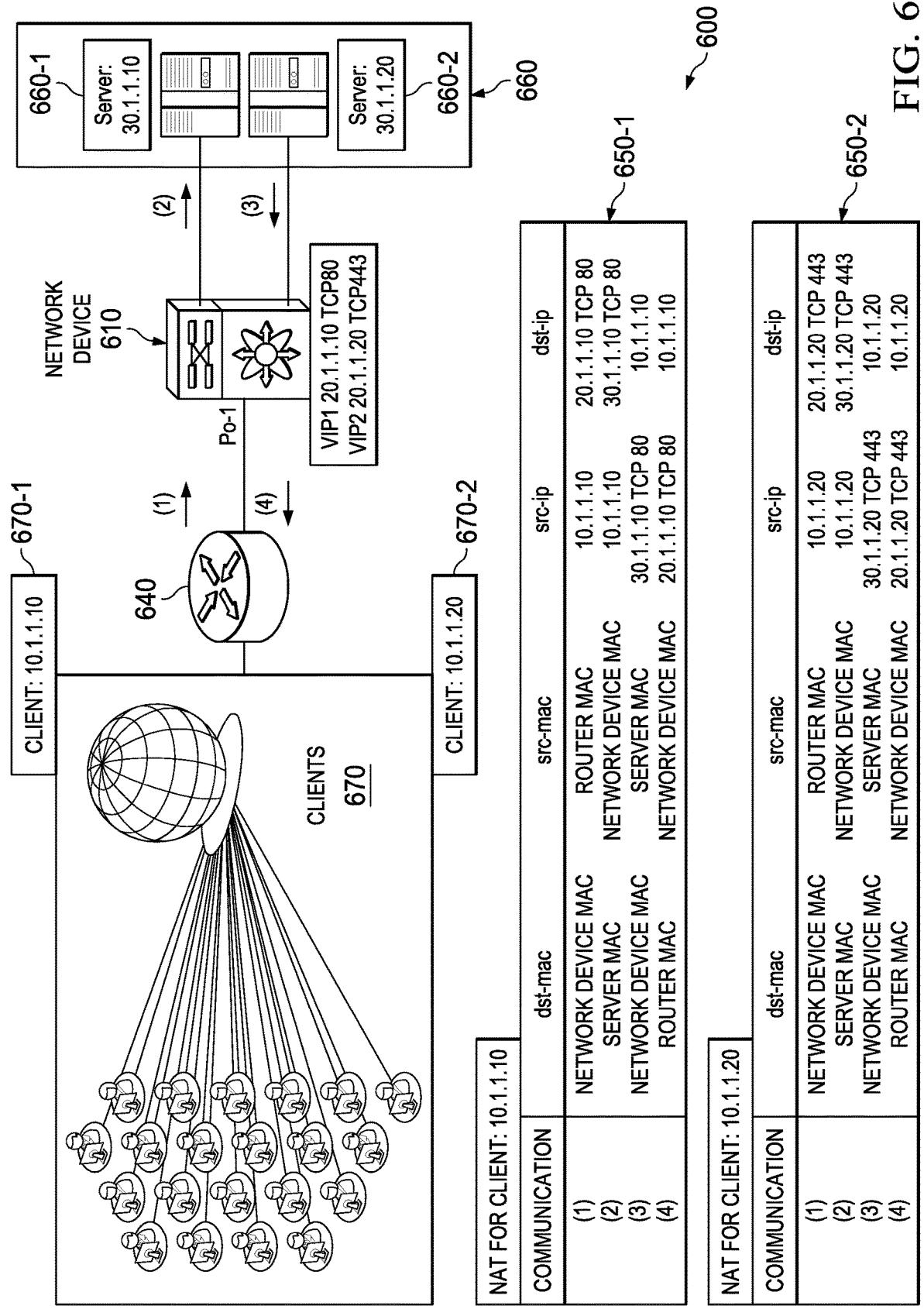
FIG. 6 is a simplified block diagram depicting possible flows in an example communication system for scalable network address translation at high speed according to at least one embodiment of the present disclosure.

With reference to FIG. 6, a simplified block diagram illustrates an example communication system 600 for performing faster destination address translation for load balancing services, according to an embodiment. Communication system 600 includes a set of servers or any service nodes 660 (e.g., firewalls, intrusion detection systems (IDSes), intrusion prevention systems (IPSes), virtual machines (VMs), etc.) and multiple clients 670 connected over a network such as the Internet, for example. A network device 610 and servers 660 may form a network in which servers 660 are accessed from external nodes, such as clients 670, via network device 610. In example communication system 600, a router 640 (or any other suitable network element) may be a next hop in the communication path from network device 610 to clients 670.

Destination network address translation is a commonly deployed feature in service appliances. Network device 610 can be a network element (e.g., switch, router, firewall, etc.) with an ingress interface (Po-1) and may facilitate communication between the clients and set of servers or service nodes. In at least one embodiment, network device 610 is configured to perform faster network address translation for load balancing the services provided by the servers or service nodes.

For illustration purposes, the network device configuration in FIG. 6 includes a service type NAT with the following example configuration information in accordance with at least one embodiment:

Service type nat<service name>
itd device-group webserver
node ip 30.1.1.10
node ip 30.1.1.20
itd test
device-group webserver
virtual ip address 20.1.1.10 TCP 80
virtual ip address 20.1.1.20 TCP 443
nat destination
ingress interface Ethernet 1/1
no shut It should be noted that in this example, for reverse NAT translation (e.g., server IP to VIP), the network device uses the protocol/port configured part of VIP to match the reverse traffic (server-to-client). This allows the rest of the server-to-server traffic, as well as the server-to-client traffic, to work independently.

In example communication system 600, clients 670-1 and 670-2 have L3 IP addresses of 10.1.1.10 and 10.1.1.20, respectively. Servers 660-1 and 660-2 have L3 IP addresses of 30.1.1.0 and 30.1.1.20, respectively. Two L3 external VIP addresses (VIP1 and VIP2) are assigned to network device 610. The VIP1 address is 20.1.1.10, port 80, and the VIP2 address is 20.1.1.20, port 443. Also, network device 610, server 660-1, server 660-2, and router 640 each have unique MAC addresses that are used in the network address translations.

In the example shown in FIG. 6, network traffic is flowing from the cloud (or set of clients) to a virtual IP address. The destination address of the traffic is to be translated to one of the servers, based on load balancing logic/hashing. The address translation in at least one embodiment, however, is done in a single processing speed.

Traffic in the forward path (client-to-server), from a client to a virtual IP (VIP) address, can be rewritten and redirected to the server IP address of a selected server of a set of servers mapped to the VIP address. With reference to a communication exchange in FIG. 6, at communication (1), network traffic is sent from client/source at 10.1.1.x to VIP/destination at 20.1.1.10 TCP 80. Network device 610 can identify servers 660-1 and 660-2 as being mapped to VIP1. Load balancing can be performed to select one of the servers to receive the traffic.

At network device 610, the traffic from client/source at 10.1.1.x to VIP1/destination at 20.1.1.10 TCP 80 is translated and redirected as client/source at 10.1.1.x to server/destination at 30.1.1.10. This is accomplished by rewriting the destination IP address in the packet, which is 20.1.1.10 TCP 80, to be the IP address of the selected server, which is 30.1.1.10 in this example. The source IP address in the packet can remain the same client IP address of 10.1.1.x. In addition, the destination MAC in the packet is rewritten as the server MAC, and the source MAC in the packet is rewritten as the network device MAC. At communication (2), the rewritten packet is forwarded to the server/destination at 30.1.1.10.

In the reverse path (server to client), traffic from a server to a client is re-translated with the VIP address as the source IP address. For example, at communication (3), traffic is sent from the server/source at 30.1.1.10 to client/destination at 10.1.1.x. At network device 610, the traffic from the server/source at 30.1.1.10 to the client/destination at 10.1.1.x is translated as VIP1/source at 20.1.1.10 TCP 80 to client/destination at 10.1.1.x. At communication (4), the rewritten packet is forwarded to client/destination at 10.1.1.x.

FIG. 6 includes two tables 650-1 and 650-2, each indicating a destination MAC address (dst-mac), a source MAC address (src-mac), a source IP address (src-ip), and a destination IP address (dst-ip) corresponding to network traffic communications (1), (2), (3), and (4) in communication system 600. Table 650-1 of FIG. 6 shows network address translation information for forward path traffic from client 670-1 at 10.1.1.10 to destination VIP1 at 20.1.1.10 TCP 80 and to selected server 660-1 at 30.1.1.10. Table 650-1 also shows network address translation information for reverse path traffic from server 660-1 to client 670-1 via VIP1.

With reference to communication exchanges represented in table 650-1, at communication (1), network traffic is sent from client/source at 10.1.1.10 to VIP1/destination at 20.1.1.10 TCP 80. Network device 610 can identify the network traffic as a match to be translated based on the policies configured in the hardware layer of the network device. Network device 610 can also identify, in the hardware layer, the previously determined L2 and L3 information to be used in the translations for redirecting the traffic to a particular set of servers in the network. In one example, ACL rules can be used to determine the packet is a match and to identify the previously determined L2 and L3 information to be used in the translations. In another example, VIP1 can be used to determine the packet is a match and to identify the previously determined L2 and L3 information to be used in the translations.

In this example, network device 610 can identify servers 660 based on their IP addresses configured in the hardware layer of network device 610 and mapped to VIP1. Also in this example, load balancing results in server 30.1.1.10 TCP 80 being selected from the identified servers 660 to receive the network traffic. At network device 610, the traffic from client/source at 10.1.1.10 to VIP1/destination at 20.1.1.10 TCP 80 is translated and redirected as client/source at 10.1.1.10 to server/destination at 30.1.1.10 TCP 80. This is accomplished by rewriting the dst-ip (destination IP in the packet) to indicate the server IP of the selected server, which is 30.1.1.10 TCP 80 in this example. The src-ip (source IP in the packet) can remain the same. In addition, the dst-mac (destination MAC in the packet) of the received network traffic is rewritten to indicate the MAC address resolved for the IP address of the selected server. In this scenario, the dst-mac is the MAC address of the selected server. Also, the src-mac (source MAC in the packet) is rewritten to indicate the network device MAC. The L2 and L3 address information in the rewritten packet is shown in table 650-1 in the row for communication (2). At communication (2), the rewritten packet is forwarded to the server/destination at 30.1.1.10 TCP 80.

In the reverse path (server to client) at communication (3), traffic is sent from the server/source at 30.1.1.10 TCP 80 to the client/destination at 10.1.1.10. At network device 610, the traffic from the server/source at 30.1.1.10 TCP 80 to the client/destination at 10.1.1.10 is received and translated as VIP1/source at 20.1.1.10 TCP 80 to client/destination at 10.1.1.10. This is accomplished by rewriting the src-ip to indicate VIP1. The dst-ip can remain the same. In addition, the src-mac of the received network traffic is rewritten to indicate the network device MAC. Also, the dst-mac is rewritten to indicate the router MAC of the next hop in the path from VIP1/source at 20.1.1.10 TCP 80 to the client/destination at 10.1.1.10. The L2 and L3 address information in the rewritten packet is shown in table 650-1 in the row for communication (4). At communication (4), the rewritten packet is forwarded to the next hop router 640 en route to the client/destination at 10.1.1.10.

Table 650-2 of FIG. 6 shows network address translation information for forward path traffic from client 670-2 at 10.1.1.20 to destination VIP2 at 20.1.1.20 TCP 443 and to selected server 660-2 at 30.1.1.20. Table 650-2 also shows network address translation information for reverse path traffic from server 660-2 to client 670-2 via VIP2. Although both tables 650-1 and 650-2 show network traffic involving VIP addresses of network device 610 that include specified port numbers, it will be apparent that other implementations can accommodate network traffic involving VIP addresses of network device 610 without specified port numbers. The particular VIP addresses (with or without port numbers and parameters) to be matched can be configured based on implementation preferences and needs when the network device is configured.

With reference to communication exchanges represented in table 650-2, at communication (1), network traffic is sent from client/source at 10.1.1.20 to VIP2/destination at 20.1.1.20 TCP 443. Network device 610 can identify the network traffic as a match to be translated based on the policies configured in the hardware layer of the network device. Network device 610 can also identify, in the hardware layer, the previously determined L2 and L3 information to be used in the translations for redirecting the traffic to a particular set of servers in the network. In one example, ACL rules can be used to determine the packet is a match and to identify the previously determined L2 and L3 information to be used in the translations. In another example, VIP2 can be used to determine the packet is a match and to identify the previously determined L2 and L3 information to be used in the translations.

In this example, network device 610 can identify servers 660 based on their IP addresses configured in the hardware layer of network device 610 and mapped to VIP2. In this example, load balancing results in server 30.1.1.20 TCP 443 being selected from the identified servers 660 to receive the network traffic. At network device 610, the traffic from client/source at 10.1.1.20 to VIP2/destination at 20.1.1.20 TCP 443 is translated and redirected as client/source at 10.1.1.20 to server/destination at 30.1.1.20 TCP 443. This is accomplished by rewriting the dst-ip to indicate the server IP of the selected server, which is 30.1.1.20 TCP 443 in this example. The src-ip can remain the same. In addition, the dst-mac of the received network traffic is rewritten to indicate the MAC address resolved for the IP address of the selected server. In this scenario, the dst-mac is the MAC address of the server. Also, the src-mac is rewritten to indicate the network device MAC. The L2 and L3 address information in the rewritten packet is shown in table 650-2 in the row for communication (2). At communication (2), the rewritten packet is forwarded to the server/destination at 30.1.1.20 TCP 443.

In the reverse path (server to client) at communication (3), traffic is sent from the server/source at 30.1.1.20 TCP 443 to the client/destination at 10.1.1.20. At network device 610, the traffic from the server/source at 30.1.1.20 TCP 443 to the client/destination at 10.1.1.20 is received and translated as VIP2/source at 20.1.1.20 TCP 443 to client/destination at 10.1.1.20. This is accomplished by rewriting the src-ip to indicate VIP2. The dst-ip can remain the same. In addition, the src-mac of the received network traffic is rewritten to indicate the network device MAC. Also the dst-mac is rewritten to indicate the router MAC of the next hop in the path from VIP2/source at 20.1.1.20 TCP 443 to the client/destination at 10.1.1.20. The L2 and L3 address information in the rewritten packet is shown in table 650-2 in the row for communication (4). At communication (4), the rewritten packet is forwarded to the next hop router 640 en route to the client/destination at 10.1.1.20.

The network address translation performed in embodiments described above is performed in a single clock cycle. This eliminates the need for packets to be re-circulated during network address translation. Accordingly, performance of network device 610 may be enhanced. In at least one embodiment, the translation is able to be performed in a single clock cycle because network device 610 is configured with destination IP addresses, destination MAC addresses, and a source MAC address. In at least one embodiment, after translation by a network device, the source MAC address is always the MAC address of the network device performing the translation (e.g., network device 610). Based on the configuration of network device 610, when client traffic specifies certain IP addresses (e.g., VIP1, VIP2), or if client traffic matches certain ACL rules, network device 610 knows the destination IP address and the destination MAC address. Accordingly, the received traffic can be translated and sent out on a wire at line rate.

Variations and implementations

In certain example implementations, the improved NAT capabilities outlined herein may be implemented by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements) can include memory for storing information to be used in achieving the improved NAT capabilities, as outlined herein. Additionally, these network elements may include at least one processor that can execute software, an algorithm, or other instructions to perform the improved NAT operations, as disclosed herein. These network elements may further keep information, to be used in achieving the improved NAT capabilities as discussed herein, in any suitable memory element (TCAM, random access memory (RAM), read only memory (ROM), EPROM, EEPROM, ASIC, etc.), software, hardware, or in any other suitable component, device, element, or object where appropriate and based on particular needs. Any of the memory items discussed herein (e.g., repositories, stores, databases, tables, caches, buffers, etc.) should be construed as being encompassed within the broad term 'memory element.' Similarly, any of the potential processing elements, modules, and machines described herein should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that the systems described herein are readily scalable and can accommodate a large number of components (e.g., hundreds (or more) servers in network 15), as well as more complicated/sophisticated arrangements and configurations. Accordingly, the examples provided should not limit the scope or inhibit the broad teachings of the more scalable NAT system as potentially applied to a myriad of other architectures or implementations.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Note that in this Specification, references to "optimize," "optimization," "optimized", "optimal" and related terms are terms of art that refer to improvements in speed, efficiency, and/or results of a specified outcome and do not purport to indicate that a process for achieving the specified outcome has achieved, or is capable of achieving, a perfectly speedy/perfectly efficient state. Also, as used herein, items may be 'mapped' to each other by any suitable marking or linking technique (e.g., pointers, indexes, file names, linked lists, file names, relational databases, hash table, bitmap, etc.), or any other technique that represents a relation, connection, association, or link between the 'mapped' items.

It is also important to note that the activities, interactions, and operations shown and described herein illustrate only some of the possible scenarios and patterns that may be executed by, or within, the nodes with improved NAT capabilities. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably.

The preceding operational flows have been offered for purposes of example and discussion. Substantial flexibility is provided by nodes with improved NAT capabilities in that any suitable arrangements, chronologies, configurations, and timing mechanisms may be provided without departing from the teachings of the present disclosure. Additionally, these activities can be facilitated by various modules and/or components which can be suitably combined in any appropriate manner, or partitioned in any appropriate manner, and which may be based on particular configuration and/or provisioning needs.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of the improved NAT system as disclosed herein.

What is claimed is:

1. A computer-implemented method for network address translation by a network device in a network, the method comprising:
   receiving configuration information at the network device, the configuration information including: (i) a match criterion for packets received at the network device, and (ii) a pool of multiple layer 3 addresses associated with a set of servers in the network, wherein the match criterion comprises at least one external layer 3 address assigned to the network device for receiving network traffic from an external source;
   resolving layer 2 destination addresses based on the layer 3 addresses of the servers;
   programming a hardware layer of the network device based, at least in part, on the match criterion, the pool of multiple layer 3 addresses, and the layer 2 destination addresses, the programming is prior to receiving data traffic including a packet addressed to the at least one external layer 3 address of the network device;
   wherein programming the hardware layer of the network device includes:
      mapping the at least one external layer 3 address of the network device in the match criterion to the pool of multiple layer 3 addresses;
      mapping each layer 3 address in the pool to a layer 2 destination address resolved for that layer 3 address; and selecting a layer 3 address of the pool of multiple layer 3 addresses corresponding to a selected server of the set of servers by load balancing among the set of servers; and redirecting, by the hardware layer of the network device, the packet addressed to the at least one external layer 3 address of the network device received at the network device from the external source to the selected layer 3 address in the pool of multiple layer 3 addresses and an associated layer 2 destination address resolved for the selected layer 3 address.

2. The method of claim 1, further comprising:
configuring a policy to indicate that any packet received by the network device from the external source is to be forwarded to a server of the set of servers if the match criterion is met.

3. The method of claim 2, wherein the hardware layer is programmed to implement the policy.

4. The method of claim 1,
wherein the match criterion further comprises multiple external layer 3 addresses assigned to the network device for receiving network traffic from the external source.

5. The method of claim 1, wherein the programming the hardware layer includes configuring access control list (ACL) rules to match the packet if the packet includes a particular layer 3 destination address indicated in the configuration information.

6. The method of claim 1, wherein the hardware layer includes ternary content-addressable memory (TCAM) of an application-specific integrated circuit (ASIC).

7. The method of claim 1, wherein redirecting the packet addressed to the at least one external layer 3 address of the network device further comprises:
receiving the packet at the network device, the packet including a layer 3 destination address corresponding to the at least one external layer 3 address of the network device;
matching the packet to the selected layer 3 address in the pool of multiple layer 3 addresses and the associated layer 2 destination address resolved for the selected layer 3 address based, at least in part, on the match criterion programmed in the hardware layer; and
providing the packet to the selected server of the set of servers that is associated with the selected layer 3 address and the associated layer 2 destination address, wherein the matching is performed in a single clock cycle.

8. The method of claim 1, further comprising:
selecting the server of the set of servers associated with the pool of multiple layer 3 addresses to receive the packet based on a policy.

9. The method of claim 1, further comprising performing reverse network address translation for communications from the selected server to the external source from which the packet was received.

10. The method of claim 1, further comprising rewriting the packet to change:
a) a layer 3 destination address in the packet from the at least one external layer 3 address of the network device to an Internet Protocol (IP) address of the selected server;
b) a layer 2 destination address in the packet to a Media Access Control (MAC) address resolved for the IP address of the selected server; and
c) a layer 2 source address in the packet to the MAC address of the network device.

11. The method of claim 1, wherein the match criterion includes at least one of a virtual Internet Protocol (VIP) address with a port number or a VIP address without a port number.

12. The method of claim 1, wherein the pool of multiple layer 3 addresses includes layer 3 (L3) Internet Protocol (IP) addresses of the set of servers.

13. The method of claim 12, wherein the layer 2 destination addresses include Media Access Control (MAC) addresses resolved for the L3 IP addresses.

14. At least one non-transitory, machine readable storage medium including code for execution that, when executed by at least one processor, causes the at least one processor to perform operations for network address translation by a network device in a network comprising:
receiving configuration information at the network device, the configuration information including: (i) a match criterion for packets received at the network device, and (ii) a pool of multiple layer 3 addresses associated with a set of servers in the network, wherein the match criterion comprises at least one external layer 3 address assigned to the network device for receiving network traffic from an external source;
resolving layer 2 destination addresses based on the layer 3 addresses of the servers;
programming a hardware layer of the network device based, at least in part, on the match criterion, the pool of multiple layer 3 addresses, and the layer 2 destination addresses, the programming is prior to receiving data traffic including a packet addressed to the at least one external layer 3 address of the network device;
wherein programming the hardware layer of the network device includes:
mapping the at least one external layer 3 address of the network device in the match criterion to the pool of multiple layer 3 addresses;
mapping each layer 3 address in the pool to a layer 2 destination address resolved for that layer 3 address; and
selecting a layer 3 address of the pool of multiple layer 3 addresses corresponding to a selected server of the set of servers by load balancing among the set of servers; and
redirecting, by the hardware layer of the network device, the packet addressed to the at least one external layer 3 address of the network device received at the network device from the external source to the selected layer 3 address in the pool of multiple layer 3 addresses and an associated layer 2 destination address resolved for the selected layer 3 address.

15. The at least one non-transitory, machine readable storage medium of claim 14, wherein the operations further comprise:
configuring a policy to indicate that any packet received by the network device from the external source is to be forwarded to a server of the set of servers if the match criterion is met, wherein the hardware layer is programmed to implement the policy.

16. The at least one non-transitory, machine readable storage medium of claim 14, wherein the match criterion further comprises multiple external layer 3 addresses assigned to the network device for receiving the network traffic from the external source.

17. The at least one non-transitory, machine readable storage medium of claim 14, wherein the operations for redirecting the packet further comprise:

receiving the packet at the network device, the packet including a layer 3 destination address corresponding to the at least one external layer 3 address of the network device;

matching the packet to the selected layer 3 address in the pool of multiple layer 3 addresses and the associated layer 2 destination address resolved for the selected layer 3 address based, at least in part, on the match criterion programmed in the hardware layer; and providing the packet to the selected server of the set of servers that is associated with the selected layer 3 address and the associated layer 2 destination address.

18. An apparatus for providing network address translation by a network device in a network, comprising:

a control plane; and a hardware layer including at least one processor operable to execute instructions associated with the control plane to:

receive configuration information at the network device, the configuration information including: (i) a match criterion for packets received at the network device, and (ii) a pool of multiple layer 3 addresses associated with a set of servers in the network, wherein the match criterion comprises at least one external layer 3 address assigned to the network device for receiving network traffic from an external source; and resolve layer 2 destination addresses based on the layer 3 addresses of the servers;

a policy management layer, wherein the at least one processor is operable to execute further instructions associated with the policy management layer to program a memory element of the hardware layer based, at least in part, on the match criterion, the pool of multiple layer 3 addresses, and the layer 2 destination addresses, the program of the memory element of the hardware layer is prior to receiving data traffic including a packet addressed to the at least one external layer 3 address of the network device, wherein the instructions to program the memory element of the hardware layer include instructions for:

mapping the at least one external layer 3 address of the network device in the match criterion to the pool of multiple layer 3 addresses;

mapping each layer 3 address in the pool to a layer 2 destination address resolved for that layer 3 address; and selecting a layer 3 address of the pool of multiple layer 3 addresses corresponding to a selected server of the set of servers by load balancing among the set of servers, and wherein the hardware layer is further configured to:

redirect the packet addressed to the at least one external layer 3 address of the network device received at the network device from the external source to the selected layer 3 address in the pool of multiple layer 3 addresses and an associated layer 2 destination address resolved for the selected layer 3 address.

19. The apparatus of claim 18, wherein, when the network device receives the packet including a layer 3 destination address corresponding to the at least one external layer 3 address of the network device, the hardware layer is to:

match the packet to the selected layer 3 address in the pool of multiple layer 3 addresses and the associated layer 2 destination address resolved for the selected layer 3 address based, at least in part, on the match criterion programmed in the hardware layer; and provide the packet to a server of the set of servers that is associated with the selected layer 3 address and the associated layer 2 destination address.

20. The method of claim 1, wherein the selecting the layer 3 address of the pool of multiple layer 3 addresses includes selecting the layer 3 address of the pool of multiple layer 3 addresses corresponding to the selected server of the set of servers by load balancing among the set of servers based on a source address and a destination address.

* * * * *